US012715003B2

(12) United States Patent
Sears et al.

(10) Patent No.: US 12,715,003 B2
(45) Date of Patent: Aug. 25, 2026

(54) INDUSTRIAL MACHINE WITH CUTTER ASSEMBLY

(71) Applicant: SSI Shredding Systems, Inc., Wilsonville, OR (US)

(72) Inventors: Todd Sears, Oregon City, OR (US); James Blasko, West Linn, OR (US)

(73) Assignee: SSI Shredding Systems, Inc, Wilsonville, OR (US)

( * ) Notice: Subject to any disclaimer, the term of this patent is extended or adjusted under 35 U.S.C. 154(b) by 262 days.

(21) Appl. No.: 18/681,319

(22) PCT Filed: Jul. 27, 2022

(86) PCT No.: PCT/US2022/074206
§ 371 (c)(1),
(2) Date: Feb. 5, 2024

(87) PCT Pub. No.: WO2023/019063
PCT Pub. Date: Feb. 16, 2023

(65) Prior Publication Data

US 2025/0010308 A1 Jan. 9, 2025

Related U.S. Application Data

(60) Provisional application No. 63/260,099, filed on Aug. 9, 2021.

(51) Int. Cl.
*B02C 18/18* (2006.01)

(52) U.S. Cl.
CPC .................................... *B02C 18/18* (2013.01)

(58) Field of Classification Search
CPC ...................................................... B02C 18/18
See application file for complete search history.

(56) References Cited

U.S. PATENT DOCUMENTS 4,360,168 A * 11/1982 Peterson, Jr. ......... B02C 18/186
241/294
4,546,929 A * 10/1985 Fritsch ...................... B29B 9/06
241/294

(Continued)

FOREIGN PATENT DOCUMENTS

DE 102012005913 A1 9/2013
JP 2001170511 A 6/2001

(Continued)

OTHER PUBLICATIONS

The International Search Report and Written Opinion for PCT Application No. PCT/US22/74206 , mailed Jul. 27, 2022, 19 pages.

(Continued)

*Primary Examiner* — Sean M Michalski
(74) *Attorney, Agent, or Firm* — Lee & Hayes, P.C.

(57) ABSTRACT

A cutter assembly in an industrial shredding machine is provided. The cutter assembly includes a wedge that tapers in an outward direction and has a first angled surface, the first angled surface extends from a base side that is configured to seat in a pocket in a rotational shaft. The cutter assembly further includes a holder with a tapered section that tapers in an inward direction toward a base side of the holder and one or more attachment device openings that are each configured to receive an attachment device.

11 Claims, 12 Drawing Sheets

(56) References Cited

U.S. PATENT DOCUMENTS

| | | | | |
|---|---|---|---|---|
| 4,930,710 | A * | 6/1990 | Hench | B26D 7/2614<br>241/294 |
| 5,042,733 | A * | 8/1991 | Hench | B02C 18/186<br>241/294 |
| 5,044,570 | A * | 9/1991 | Montgomery, Sr. | B27L 11/005<br>241/300 |
| 5,195,685 | A * | 3/1993 | Dumaine | B02C 18/186<br>241/242 |
| 5,711,492 | A * | 1/1998 | Cheladze | B02C 18/182<br>241/300 |
| 5,873,534 | A * | 2/1999 | Shinn | A01G 23/093<br>241/294 |
| 6,322,012 | B1 * | 11/2001 | Paper | B02C 18/18<br>241/243 |
| 6,422,495 | B1 * | 7/2002 | De Boef | B02C 18/067<br>241/294 |
| 6,435,434 | B1 * | 8/2002 | Monyak | B02C 13/2804<br>241/300 |
| 6,837,453 | B2 * | 1/2005 | Sturm | B27L 11/005<br>241/243 |
| 7,487,931 | B2 * | 2/2009 | Monyak | B28D 1/26<br>241/300 |
| 7,584,921 | B1 * | 9/2009 | Bennington | B02C 18/145<br>241/294 |
| 8,066,213 | B2 * | 11/2011 | Marquardsen | B02C 18/18<br>241/242 |
| 8,167,225 | B2 * | 5/2012 | Gaudreault | B02C 18/18<br>241/101.77 |
| 8,893,997 | B2 * | 11/2014 | Gaudreault | B23C 5/2239<br>241/242 |
| 9,168,672 | B2 * | 10/2015 | Hinchliff | B27G 13/10 |
| 9,227,192 | B2 * | 1/2016 | Roy | B02C 18/145 |
| 9,238,893 | B2 * | 1/2016 | Latham | E01C 23/088 |
| 9,623,420 | B2 * | 4/2017 | Dobrovosky | B02C 13/06 |
| 9,631,490 | B2 * | 4/2017 | Latham | E21C 35/1933 |
| D798,913 | S * | 10/2017 | Whittaker | D15/28 |
| 10,787,774 | B2 * | 9/2020 | Latham | B02C 13/28 |
| 10,953,406 | B2 * | 3/2021 | Denis | A01D 34/835 |
| 11,408,135 | B2 * | 8/2022 | Latham | B27C 1/005 |
| 12,457,912 | B2 * | 11/2025 | Latham | A01B 29/045 |
| 2001/0045478 | A1 * | 11/2001 | Recker | B02C 18/145<br>241/294 |
| 2004/0155131 | A1 * | 8/2004 | Bardos | B02C 18/18<br>241/189.1 |
| 2008/0105773 | A1 | 5/2008 | Roozeboom | |
| 2009/0008491 | A1 * | 1/2009 | Sharp | E02F 9/2866<br>241/294 |
| 2011/0226880 | A1 * | 9/2011 | Marquardsen | B02C 18/18<br>241/195 |
| 2012/0032013 | A1 * | 2/2012 | Rice | B02C 18/18<br>241/292.1 |
| 2013/0099039 | A1 * | 4/2013 | Gaudreault | B02C 18/18<br>241/291 |
| 2013/0112792 | A1 * | 5/2013 | Doppstadt | B02C 18/18<br>241/300 |
| 2014/0346263 | A1 * | 11/2014 | Pfoltner | B02C 18/145<br>241/292.1 |
| 2015/0306604 | A1 * | 10/2015 | Domer | B29B 7/7452<br>241/294 |
| 2016/0243552 | A1 * | 8/2016 | Leuschen | B02C 13/2804 |
| 2017/0008005 | A1 * | 1/2017 | Roth | B27L 11/005 |
| 2017/0106375 | A1 * | 4/2017 | Gaudreault | A01G 23/093 |
| 2017/0203302 | A1 * | 7/2017 | Fredsall | B02C 13/06 |
| 2017/0341082 | A1 * | 11/2017 | Doppstadt | B02C 18/146 |
| 2019/0358643 | A1 * | 11/2019 | Watts | A01G 23/067 |

FOREIGN PATENT DOCUMENTS

| | | | |
|---|---|---|---|
| JP | 2004275878 | A | 10/2004 |
| JP | 2005334710 | A | 12/2005 |
| JP | 2007517662 | A | 7/2007 |
| JP | 2011183306 | A | 9/2011 |
| WO | 2005070552 | A1 | 8/2005 |

OTHER PUBLICATIONS

Office Action for Japanese Application No. 2024-508374, dated Apr. 13, 2026, 10 pages.

* cited by examiner

INDUSTRIAL MACHINE WITH CUTTER ASSEMBLY

CROSS-REFERENCE TO RELATED APPLICATION

This is the 371 National Phase of International Application No. PCT/US22/74206, filed Jul. 27, 2022, which claims priority to and the benefit of the earlier filing of U.S. Provisional Application No. 63/260,099, filed Aug. 9, 2021; each of which is incorporated by reference herein in its entirety.

BACKGROUND

Industrial machines, such as shredders and reducers, commonly use cutters mounted on a rotor. During machine operation, the cutters interact with stationary trays to break up materials into smaller constituents. Using removable cutters in the machine allows for cost-effective repair and replacement and further enables the machine to be adapted based on changes in material processing requirements and the type of bulk material fed into the machine.

Prior attempts to incorporate removable cutters has resulted in component failure. For instance, bolts attaching the cutter assemblies to the rotor can experience fatigue that is caused by machine vibration, causing them to break prematurely. In specific machines, pockets, in which the cutter assembly resides, experience wear due to vibrations that develop during machine operation. This pocket wear may exacerbate bolt fatigue. More frequent machine repair and reduced throughput may result from the unwanted bolt wear. For instance, machines designed to break down durable materials, such as wires and tires, have previously necessitated cutter repair or replacement on a weekly and in some cases daily basis.

Certain industrial machines have attempted to use inwardly tapered wedges in cutter assemblies to decrease cutter assembly degradation. In these systems, the wedge decreases in thickness towards its base. However, these inwardly tapered wedges have presented significant challenges with regard to cutter removability. For instance, the wedge may drive the cutter into a recess to a point where jack screws are unable to break the wedge free. In this scenario, heating of the assembly (via a blowtorch, for example) may be necessitated for cutter removal. To avoid the need for convoluted wedge removal procedures that involve cutter heating, certain end-users frequently disassemble the cutters and apply an anti-seize compound in an effort to avoid the cutter seizing in the shaft. However, this disassembly is time consuming, tedious, and results in decreased machine throughput. Previous industrial machines have therefore fallen short of reaching end-user goals related to durability, cutter removability, and material processing demands. As such, the inventors have recognized an unmet need for an industrial machine that diminishes tradeoffs between cutter removability and durability.

SUMMARY

To address at least some of the issues with previous industrial machines, a cutter assembly in an industrial machine is provided. In one example, the cutter assembly includes a wedge that tapers in an outward direction and includes a first angled surface. In such an example, the first angled surface in the wedge extends from its base side. The base side is configured to be seated in a pocket of a rotational shaft. The cutter assembly further includes a holder with a tapered section. The tapered section reduces in thickness in an inward direction toward a base side of the holder. Further, the tapered section of the holder includes a second angled surface that is configured to form an interface with the first angled surface. The holder additionally includes one or more attachment device openings that are each configured to receive an attachment device. Using an outwardly tapered wedge in this manner decreases play between the pocket and the cutter assembly and resultantly reduces cutter assembly wear which is caused by shaft vibration. To elaborate, the outward taper of the wedge allows the cutter to be securely mounted on the shaft and decreases play that arises from machining tolerances while reducing the likelihood of the cutter seizing in the pocket due to the friction created by the wedge. This results in longer intervals between machine servicing and repair and increases servicing and repair efficiency. Consequently, machine throughput and profitability may be correspondingly increased.

In one example, the wedge may include a first step and the holder may include a second step. Further, in such an example, the first and second steps mate, and the first step constrains outward movement of the holder. In this way, the holder may be blocked from falling out of the pocket when, for example, bolts that retain the holder in the pocket degrade. Therefore, degradation of other components in the machine may be avoided, and machine durability and longevity is further increased.

Further, in one example, the cutter may be constructed out of a different type of steel than the wedge. For instance, the wedge may be constructed out of a lower hardness (e.g., lower tensile strength) steel than the cutter. In this way, the material properties of the different sections of the assembly can be tuned to suit the variations in expected loads, abrasive wear, and the like experienced by the components. As a result, cutter longevity may be increased through the use of more durable steel in areas where it is desired. The cost of the assembly can also be driven down by using less expensive materials in areas expected to experience less abrasion and/or loading, for instance. In this way, machine durability and longevity can be increased without unduly increasing machine manufacturing costs.

To the accomplishment of the foregoing and related ends, certain illustrative aspects of the system are described herein in connection with the following description and the attached drawings. The features, functions, and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

DETAILED DESCRIPTION

A replaceable cutter assembly for an industrial machine is provided herein. The cutter assembly includes a wedge tapering in an outward direction (away from the rotational axis of a rotor). When installed, the wedge mates with a holder in a pocket of the rotor. The tapered interface formed between the wedge and the holder allows reaction forces from the pocket to reduce unwanted cutter motion during machine use (e.g., shredding operation). Furthermore, designing the wedge tapering in an outward direction allows the cutter assembly to be more efficiently removed by reducing the chance of the holder seizing in the pocket. Increasing cutter removability affords several benefits, such as allowing the cutters to be rapidly removed, repaired, reinstalled or replaced. As such, the cutter removal procedure may unfold in a more efficient manner, and the interval of machine operation between cutter repair or replacement can be extended, if desired. Further, the cutter assembly described herein is highly adaptable. For instance, in certain scenarios, the structural and material characteristics of the cutter assembly used in the machine may be selected to allow the cutter assembly to conform to changes in the bulk material(s) used in the machine and/or material processing demands of the end-user. As a result, the machine has applicability across a wide range of industries.

Additionally, the different components in the assembly may have varying wear characteristics and, to a certain extent, experience a variance in stresses. As such, using a multi-piece cutter assembly allows the components to be individually tailored to hold up to the expected stresses. In one example, the cutter may therefore be constructed out of a higher strength and more abrasion resistant steel than the steel used for wedge construction. Consequently, the material properties of the cutter assembly can be granularly altered to increase assembly durability. Further, production costs may be decreased by using a lower cost steel for the wedge, when compared to assemblies that use a higher cost steel for a one-piece wedge and cutter. This ultimately results in large gains in customer satisfaction and machine profitability by simplifying machine repair, alteration, and servicing and increasing the interval between cutter servicing.

Figure 1:
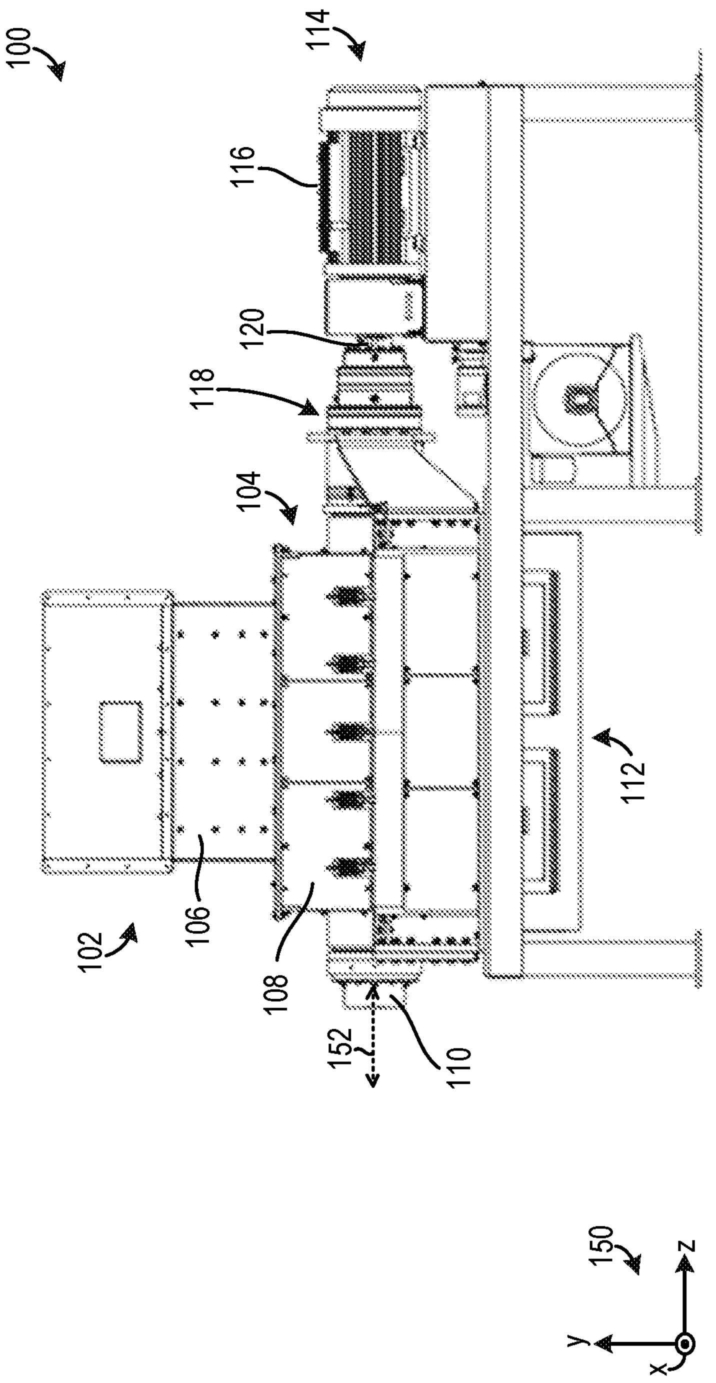
FIG. 1 shows an industrial machine with a cutting compartment.

FIG. 1 shows a first embodiment of an industrial machine 100. The industrial machine 100 specifically illustrated in FIG. 1 is an industrial shredding machine. However, it will be understood that the cutter assemblies, described in greater detail herein, may be used in other machines, such as reducers or other machines that demand the attachment of cutters to a rotational shaft. As such, the cutter assembly may be used in fields such as the recycling industry, the lumber industry, the mining industry, food processing industries, the defense industry, etc. For instance, the cutter assembly may be used in sawmill machinery such as debarking machines and chippers. It will also be understood that reducing machines may be designed to reduce the volume of tougher materials than shredders. Moreover, shredders utilize shearing to process materials, while reducers process materials via shearing, crushing, piercing, etc. For this reason, reducing machines may have larger spacing between shaft cutters than shredders that have relatively small shear gaps.

The industrial machine 100 may include a hopper 102 coupled to a cutting compartment 104. The hopper 102 is designed to guide materials into the cutting compartment 104. As such, the hopper 102 includes walls 106 to contain the materials slated for reduction.

The cutting compartment 104 may also include walls 108 for containing the material slated for reduction. The cutting compartment 104 includes a rotational shaft 110, with cutter assemblies coupled thereto, and may include a cutting tray. During machine operation, the cutter assemblies interact with the cutting tray to shred or otherwise process the material(s) fed into the compartment from the hopper into smaller constituents. Once processed, the material(s) may fall into a catchment bin 112. However, in other configurations, the material(s) may be moved away from the machine via a conveyor belt, conduits, or other removal mechanisms. The configuration of the machine with regard to the catchment bin or conveyor may take into account end-user requirements such as storage, processing targets, facility layout, and the like.

The industrial machine 100, shown in FIG. 1, is designed to reduce a variety of material including but not limited to metals, polymers (e.g., plastics), forestry products (e.g., lumber, structurally engineered lumber (e.g., wood composites, glue-lamination timber, etc.)), medical waste, electronic waste, hazardous waste, etc. Specifically, in one use-case example, the material may include tires and the machine may therefore shred synthetic rubber and the metal integrated therein (e.g., metal belts, metal beads, etc.). In another use-case example, the industrial machine 100 may shred cables (e.g., electrical cables, high tension cables, and the like) and metal such as steel, aluminum, and combinations thereof. It will be understood that the material may be selected by the end-user, and the material construction and/or profile of the cutters in the machines may be selected based on the type of material used in the machine.

The industrial machine 100 in FIG. 1 additionally includes a drive assembly 114 designed to impart rotational energy to the rotational shaft 110. To that end, the drive assembly 114 may include a prime mover 116 (e.g., electric motor, hydraulic motor, internal combustion engine, combinations thereof, and the like) that rotates the shaft 110 during operation. The industrial machine 100, shown in FIG. 1, specifically positions the prime mover 116 on one side of the cutting compartment 104. Machines with alternate prime mover arrangements have been envisioned, such as machines with two motors on opposing sides of the cutting compartment, for instance.

The drive assembly 114 and/or the rotational shaft 110 may additionally include bearings 118 designed to support and facilitate rotation of the shaft and an output shaft 120 of the prime mover 116. The bearings may therefore include races, roller elements, etc. to allow for shaft rotation and support.

The prime mover 116 is designed to rotate its output shaft 120 and the rotational shaft 110, correspondingly, in at least one direction (e.g., counterclockwise and/or clockwise). Specifically, in the shredding machine use-case example, the prime mover may be designed to rotate the shaft in solely one rotational direction. However, alternatively, in the reducing machine use-case example, the prime mover may be configured to rotate the shaft in opposing rotational directions. Providing for shaft rotation reversal allows the machine to efficiently reduce materials that would otherwise bind in the machine.

The drive assembly 114 may include a controller that is programmed to carry out material processing schemes. For instance, the controller may send commands to actuators in the drive assembly and receive signals from various components and sensors at various locations in the machine. As such, sensors generating signals indicative of the rotational speed of the shaft may be included in the machine. However, in other examples, the shaft speed may be determined based on the configuration of the prime mover 116. Thus, in one control scenario, rotational shaft speed may be adjusted based on user interaction with a control interface. However, in other examples, more automated machine control strategies may be programmatically implemented.

An axis system 150 is shown in FIG. 1, as well as FIGS. 2-18, to establish a common frame of reference. In one example, the y-axis may be parallel to a gravitational axis, the x-axis may be a lateral axis, and the z-axis may be a longitudinal axis. However, other orientations of the axes may be used, in other examples. Furthermore, as described herein, an axial direction is a direction that is aligned with or parallel to the rotational axis of the shaft and cutter assembly, and a radial direction is a direction that is perpendicular to the shaft's rotational axis. Additionally, a rotational axis 152 is provided in FIGS. 1-18, when appropriate.

FIGS. 2-5 show a first embodiment of a cutter assembly 200. The cutter assembly 200, as well as the other cutter assembly embodiments described herein, may be installed in pockets of a rotational shaft such as the rotational shaft 110, shown in FIG. 1.

Figure 2:
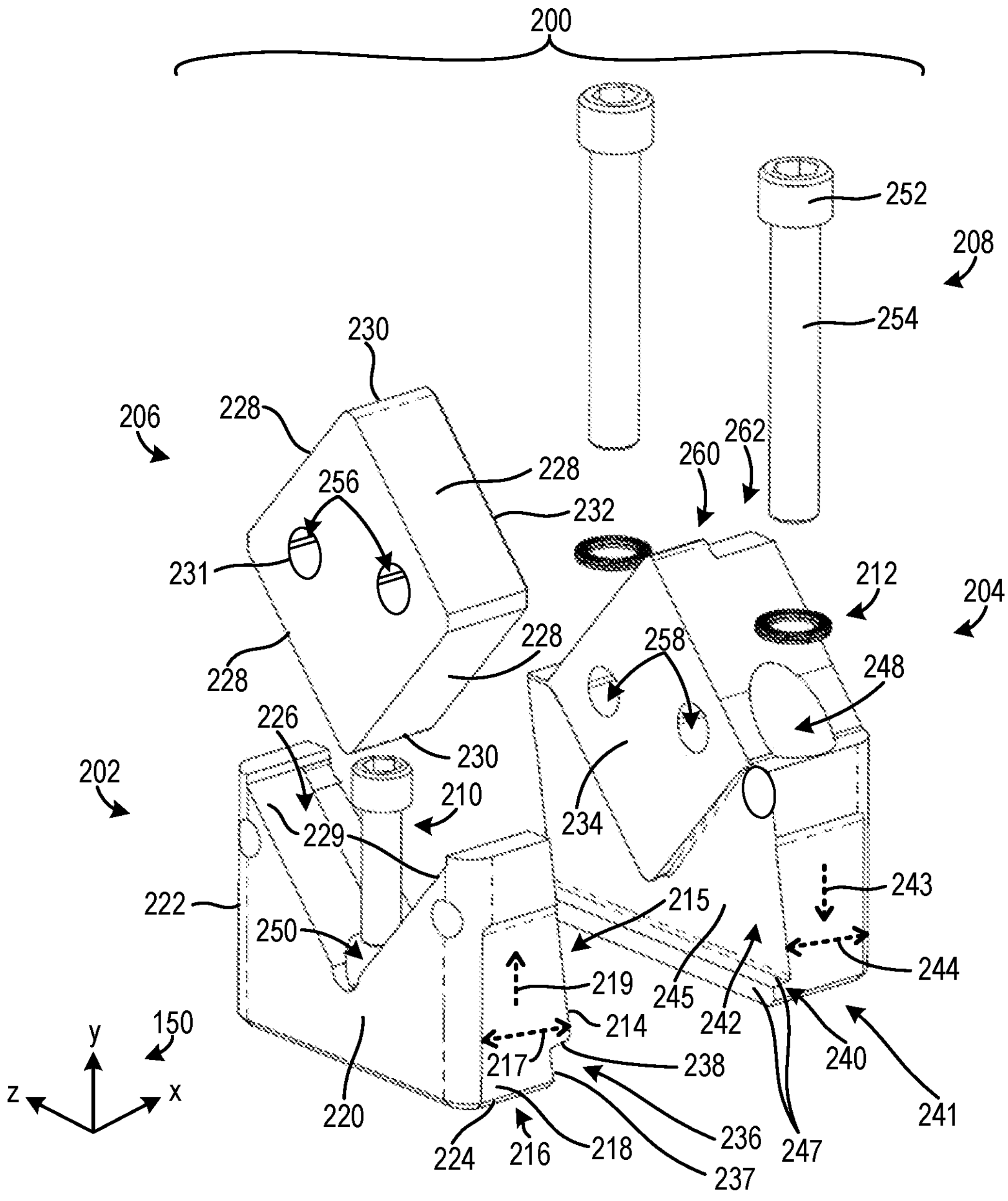
FIGS. 2-5 show different views of a first embodiment of a cutter assembly.

Turning specifically to FIG. 2, a wedge 202, holder 204, cutter 206, attachment devices 208, 210, and washers 212 are illustrated. The wedge 202 tapers in an outward direction (indicated via arrow 219). As described herein, an outward direction is a direction that extends away from the rotational axis of the rotational shaft, and an inward direction is a direction that extends toward the rotational axis. To elaborate, the wedge 202 includes an angled surface 214 that extends away from a base side 216 of the wedge. Specifically, the angled surface 214 is included in a tapered section 215 that tapers (e.g., decreases in width 217 along the x-axis) in the outward direction 219, away from the rotational axis of the shaft. The wedge 202 further includes side surfaces 218, 220, 222 that may be adjacent to walls of a pocket in which the cutter assembly is installed. Further, a base surface 224 of the base side 216 may be adjacent to a lower surface of the pocket, when the cutter assembly is installed.

Additionally, the wedge 202 may include a detent 226 contoured to receive the cutter 206. Specifically, when assembled, two of the faces 228 of the cutter 206, which are lower than the other faces, may be in contact with surfaces 229 of the detent 226. In the illustrated example, the cutter 206 has a diamond shape that is formed by the four faces 228. In this diamond cutter arrangement, edges 230 are located at the top and bottom of the cutter. However, cutters with alternate profiles have been envisioned, such as rectangular cutters, square cutters, cutters with multiple polygonal shapes (e.g., cutters with multiple diamond, square, and/or rectangular shapes), and the like.

In the square cutter example, the cutter may have a similar orientation as the diamond cutter with one of the edges at the top side. However, when a square cutter is used, as opposed to the diamond cutter, the material used in the cutter may be reduced. The added strength achieved by the multi-piece cutter assembly allows a cutter, such as a square cutter, that does not extend as deep into the wedge as the diamond cutter, to be used in the assembly. Manufacturing time and cost may therefore be decreased when a square cutter is used, when compared to a diamond cutter, without significantly diminishing the structural integrity of the assembly. During machine operation (e.g., shredding operation), edges of the cutter positioned outward from the pocket, in which the assembly is installed, may interact with a cutting tray and material in the cutting compartment.

The cutter 206 has opposing planar faces 231, 232 that may be radially aligned, when installed on the shaft. Further, the face 232 may be adjacent to (e.g., in face sharing contact with) a face 234 of the cutter 206 in the holder 204. However, the cutter may not be wedged into place, when the assembly is installed, due to the alignment of the cutter 206 and a cutting protrusion 260 in the holder 204, but may be held in place by other forces as explained in further detail below. The cutter 206 may consequently be more efficiently removed.

The wedge 202 may further include a step 236 on its base side 216. The step 236 may specifically include an overhang 238 the restricts movement of a step 240 in the holder 204. The step 236 further includes a recessed surface 237 that intersects the overhang 238. The holder step 240 may be located at a base side 241 of the holder 204 and include two intersecting surfaces 247. Because of the ability of the step 236 to restrict holder movement, the holder may be prevented from falling out of the pocket when the bolts degrade.

The holder 204 may include a tapered section 242 with tapers in an inward direction (indicated via arrow 243). As such, the width 244 of the tapered section 242 of the holder (measured along the x-axis), decreases in the inward direction. To expound, an angled surface 245 in the holder 204 may be contoured to interface with the angled surface 214 in the wedge 202. In this way, the interface between the wedge 202 and the holder 204 is formed by inclined planes that allow a radial inward force exerted on the holder to be converted into a force normal to the inclined plane to increase friction between the cutter assembly and the pocket. As a result, the cutter assembly may be more tightly held in the pocket, when installed. Further, by designing the wedge with an outward taper, the components of the assembly can be more easily removed during assembly, replacement, and repair. For instance, once attachment devices 208 that extend through openings 248 in the holder 204 are unthreaded from the pocket, the holder may move slightly upward such that the width of the assembly decreases along the x-axis decreases. This facilitates efficient cutter assembly removal.

The wedge 202 may include an attachment device opening 250 sized to receive attachment device 210. Additionally, as previously indicated, the holder 204 may include attachment device openings 248 sized to receive attachment devices 208. The attachment device openings 248, 250 may specifically be radially aligned with regard to the rotational axis of the shaft in which the cutter assembly is arranged.

The attachment devices 208, 210 may be similarly sized, in some examples. For instance, in one use-case example, the attachment devices 208, 210 may have a 20 millimeter diameter (referred to in the art as an M20 bolt). Further, the attachment devices are depicted as socket head cap screw bolts. However, numerous suitable bolts sizes and types have been contemplated for use in the assembly and may be selected based on factors such as the expected loading of the bolts, the types of materials used in the machine, the range of shaft operating speeds, and the like.

In the depicted embodiment, the attachment devices 208, 210 have heads 252 and shanks 254, although other device designs are possible. Further, the shanks 254, in the illustrated example, are unthreaded, but it will be understood that the shanks may include threaded sections at distal ends below unthreaded sections. The openings sized to receive the attachment devices in the wedge and/or holder may be in the form of a counterbore to enable the heads of the bolts to compactly reside in the openings. Further, the pocket in the rotational shaft may include threaded openings sized and positioned to receive the attachment devices 208, 210. Washers 212, for load distribution of the attachment devices 208, 210, may further be included in the cutter assembly 200.

The cutter 206 may further include attachment device openings 256 (e.g., laterally aligned attachment device openings). Specifically, in one example, the attachment device openings 256 may be tangentially aligned, when installed in the shaft pocket. As described herein, tangential alignment denotes that a component or feature touches or approaches a peripheral curve of the shaft but does not intersect the peripheral curve. However, the openings 256 may have alternate orientations, in other examples. The holder 204 further includes attachment device openings 258 (e.g., laterally aligned attachment device openings).

The holder 204 may further include a cutting protrusion 260 at an upper side 262. The cutting protrusion 260 and the remaining portions of the holder may form a monolithic structure which may increase the structural integrity of the holder when compared to multi-piece holder constructions. However, the holder 204 may be designed with multiple sections in machines expected to experience less loading, in alternate embodiments, for instance.

During installation of the cutter assembly 200, the attachment device 210 may be inserted through the opening 250 and then threaded into a threaded bore in a pocket. In this way, the wedge is secured in the pocket and its position is set. Next, the attachment devices 208 may be inserted through the attachment device openings 248 in the holder 204. Due to the torquing of the attachment devices 208, the wedge and the holder are tightly locked into a desired location due to the forces generated by the complementary tapered surface in the holder and the wedge. However, due to the tapering of the wedge 202 in the outward direction, and due to the tapering of a complementary section of the holder 204 in the inward direction, the holder can be more easily removed when the attachment devices are released. For instance, jack screws may be inserted through the openings 248 and threaded into the pocket holes to break the holder free. Consequently, the cutter assembly may be tightly wedged into the pocket when installed but then quickly removed when component repair or replacement in the assembly is wanted.

Continuing with the installation sequence, the cutter 206 may be placed in the detent 226 of the wedge 202 to set the cutter's position (e.g., height). Subsequently, attachment devices are inserted through the openings 258 in the holder 204 and screwed into the openings 256 in the cutter 206, which is threaded. Conversely, to remove the cutter assembly, the installation sequence may be reversed, but jack screws may be used to break the holder free, for instance.

The components in the cutter assembly 200 may be constructed out of different types steel to decrease manufacturing costs. For instance, the wedge 202 may be expected to experience less loading and/or abrasion than the cutter 206. The cutter may therefore be constructed out of a higher strength steel than the wedge. The lower strength steel may be less costly than the higher strength steel but may also be more efficiently machined, thereby reducing manufacturing time. As such, in one use-case example, the wedge may be constructed out of A36 steel and the cutter may be constructed out of a higher grade tool steel. Further, in such an example, the holder may also be constructed out of the tool steel. However, other metals, such as titanium and/or aluminum, may be used in construction of at least some of the cutter assembly components, in alternate embodiments, which may however increase machine manufacturing costs, in the case of titanium.

Figure 3:
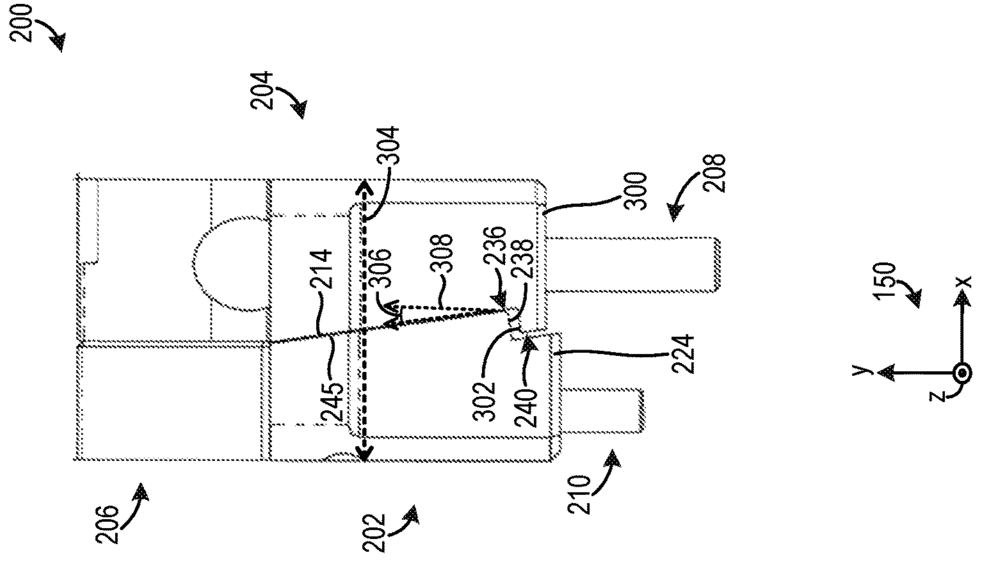

FIG. 3 shows an assembled side view of the cutter assembly 200 with the holder 204, the wedge 202, the cutter 206, and the attachment devices 208, 210. FIG. 3 further shows the step 240 in the holder 204 positioned underneath the overhang 238 in the step 236 in the wedge 202. In this way, the wedge 202 may delimit outward movement of the holder 204 even when the bolts securing the holder to the pocket degrade (e.g., shear).

When installed, the base surface 224 of the wedge 202 may be in contact with a surface of the pocket of the rotational shaft while a base surface 300 of the holder 204 may be spaced away from the lower pocket surface. Further, an upper surface 302 of the holder step 240 may be adjacent to the overhang 238 of the wedge step 236, when inserted into the pocket. In such a position, a width 304 (as measured along the x-axis) of the cutter assembly 200 may be smaller than the width of the assembly when the steps 236, 240 have a gap therebetween. However, in a subsequent installation step, the holder may be moved inward by torquing the attachment devices 208. Moving the holder closer to the bottom surface of the pocket increases the width 304 of the assembly. In this way, the cutter assembly 200 may be wedged into the pocket to reduce the chance of unwanted movement of the assembly during machine operation.

An angle 306 of the angled surface 214 in the wedge 202 is illustrated. In particular, the angle 306 is formed by the angled surface 214 and a radial axis 308. The angle 306 may be between 6 and 12 degrees or any fraction thereof. Specifically, in one use case example, the angle may be in the range between 8-10 degrees or any fraction thereof. The angled surface 245 in the holder 204 may be similarly angled. Designing the wedge angles in the aforementioned ranges allows the friction between the cutter assembly 200 and the pocket cause by the wedge effect to drastically reduce unwanted component movement and wear while permitting the assembly to be efficiently removed without undue effort. For instance, the maintenance interval on the cutter assembly may be increased while decreasing the duration of the cutter removal process.

Figure 4:
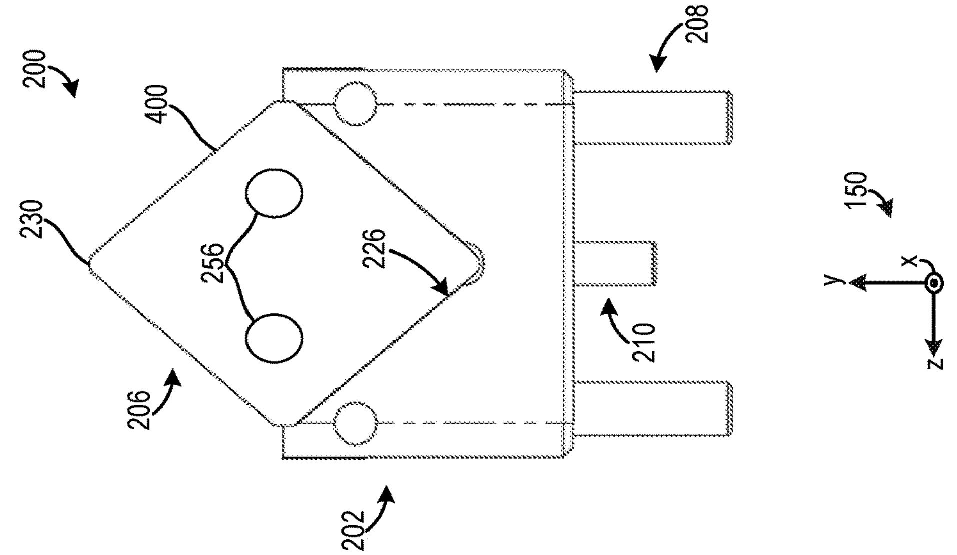

FIG. 4 shows a front view of the cutter assembly 200 with the cutter 206, the wedge 202, and the attachment devices 208, 210. As shown, the cutter 206 seats in the detent 226 in the wedge 202 thereby fixing the radial position of the cutter 206. To elaborate, an upper side of the cutter 206 resides above the wedge detent 226 and therefore interacts with the processed material during shredding. In particular, the edges 230, 400 of the cutter 206 outward from the wedge 202 may shear through or otherwise interact with the bulk material fed into the machine's cutting compartment. The openings 256 in the cutter 206 are further depicted in FIG. 4.

Figure 5:
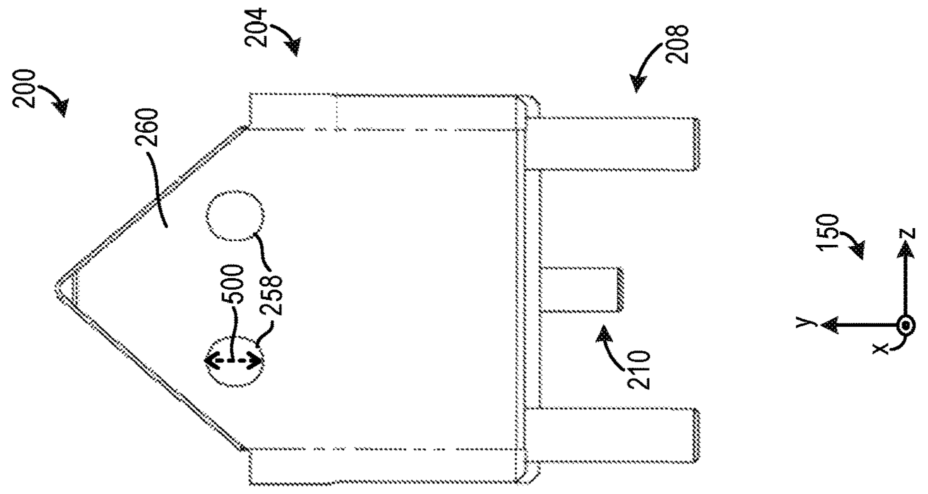

FIG. 5 shows a rear view of the cutter assembly 200 with the holder 204 and attachment devices 208, 210 specifically depicted. The cutting protrusion 260 in the holder 204 is shown along with the openings 258. The height 500 of the openings 258 (measured along the y-axis) may be sized to accommodate for movement of the holder during installation with the attachment devices that thread into the cutter extend therethrough. The openings 258 may therefore have an elongated oval shape. In this way, the attachment devices may not pose an impediment to wedging the holder into place during installation.

Figure 6:
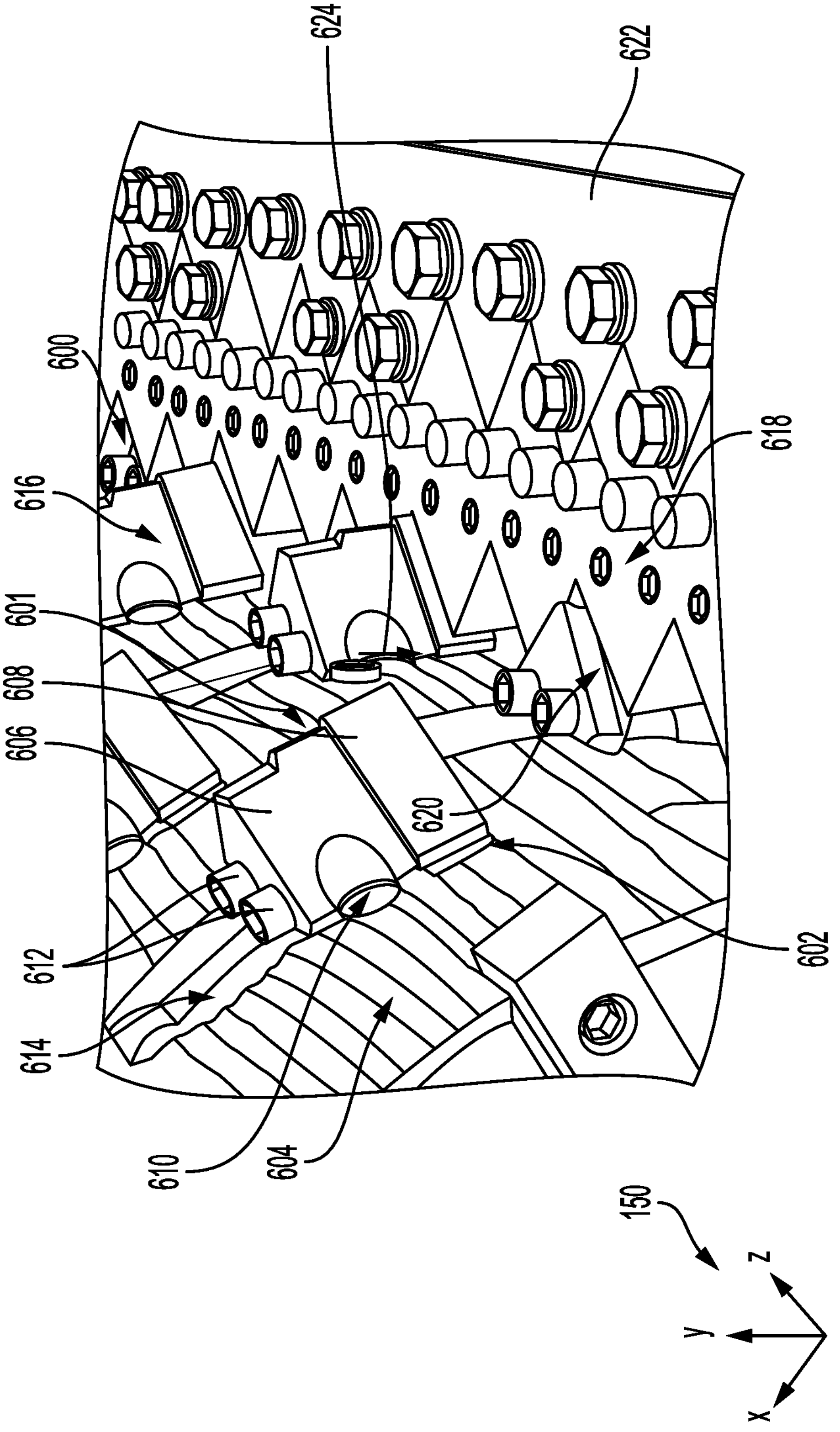
FIG. 6 shows a cutter assembly installed in a rotational shaft.

FIG. 6 depicts an industrial machine 600 with a cutter assembly 601 installed in a pocket 602 of a rotational shaft 604. The cutter assembly 601 again includes a holder 606 and a cutter 608 that is seated in a wedge. Attachment devices 610 (e.g., radially aligned bolts) are shown securing the holder in the pocket 602. Further, attachment devices 612 are shown extending through the holder 606 and engaging with threaded openings in the cutter 608.

To access and manipulate the attachment devices 612, pocket holes 614 may be formed in the rotational shaft 604. The cutter assembly 601 may have common structural and functional features with the cutter assembly 200, shown in FIGS. 2-5. Further, the other cutter assembly embodiments may share at least some common structural and functional features with the cutter assembly 200, shown in FIGS. 2-5. Redundant description of the overlapping features in the different embodiments of the cutter assemblies provided herein is omitted for concision.

In the illustrated embodiment, the rotational shaft 604 includes additional cutter assemblies 616 that have a similar construction to the cutter assembly 601. The cutter assemblies 616 may be arranged circumferentially and/or axially along the shaft in rows. A cutting tray 618 with cut-outs 620 is shown interacting with the cutter assemblies 616. The cutting tray 618 may be bolted or otherwise fixedly attached to a frame 622 of the industrial machine 600. The cut-outs 620 and the cutter assemblies 616 may specifically be complementary shaped. As such, when the shaft rotates in direction 624, the material in the machine may be broken up by the interaction between the cutting tray 618 and the cutter assemblies 616.

FIGS. 7-10 depict a second embodiment of a cutter assembly 700. The cutter assembly 700 again includes a holder 702 and a wedge 704. The holder 702 and the wedge 704 include complementary angled surfaces 706, 708, similar to the cutter assembly 200, depicted in FIGS. 2-5.

Figure 8:
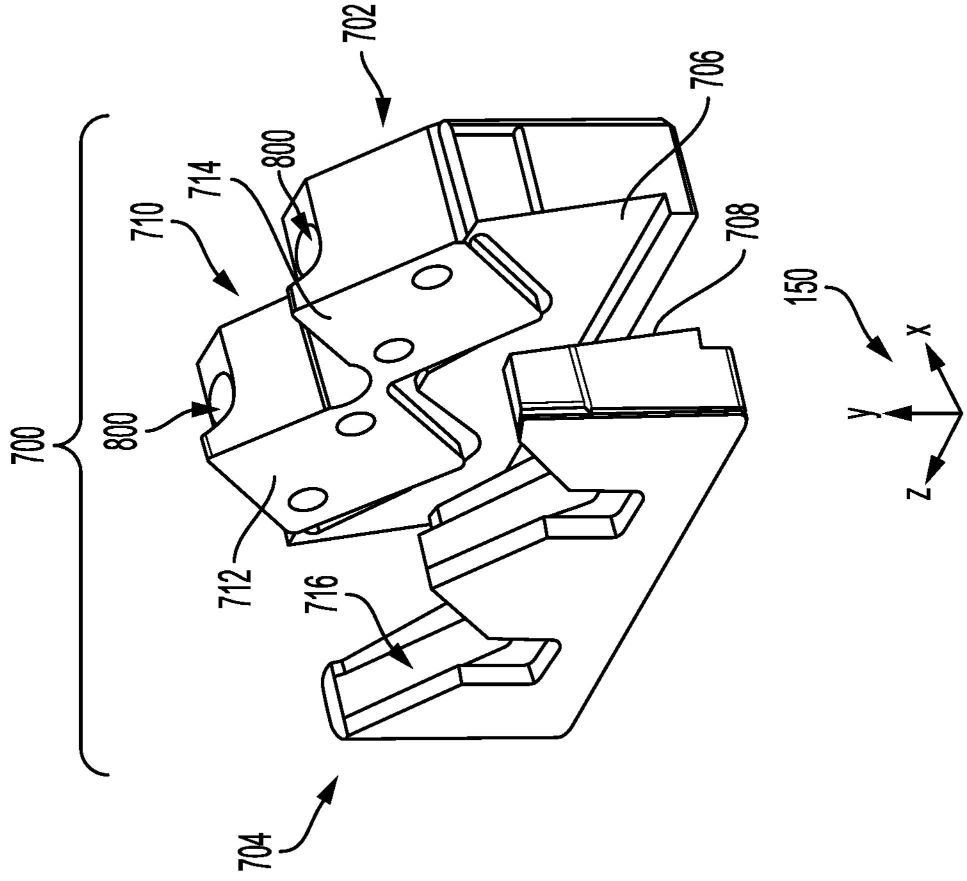
FIGS. 7-10 show a second embodiment of a cutter assembly.
Figure 7:
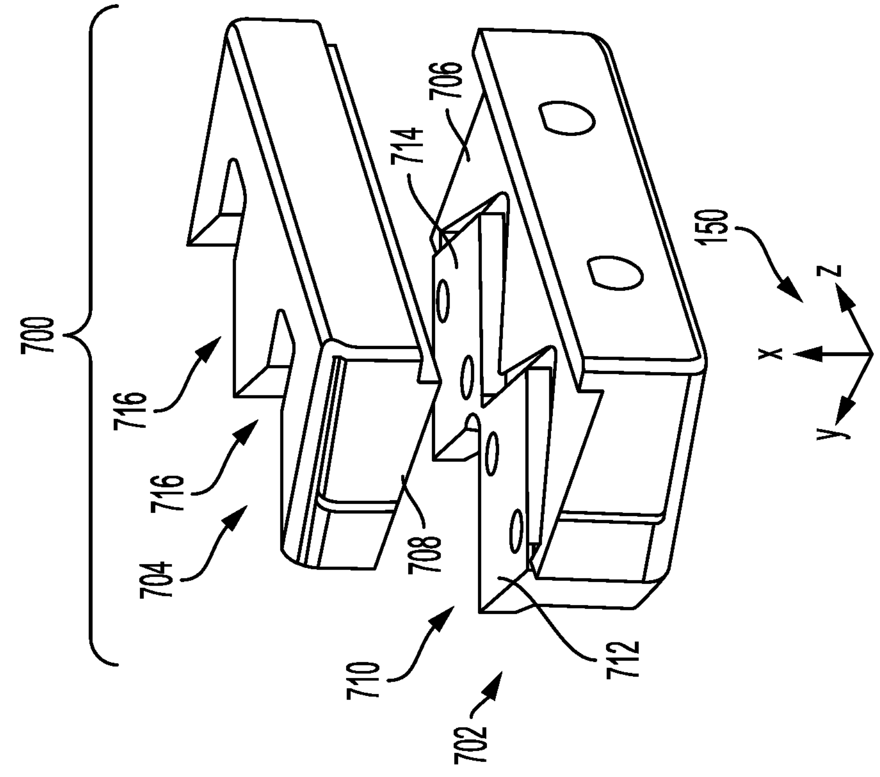
Figure 10:
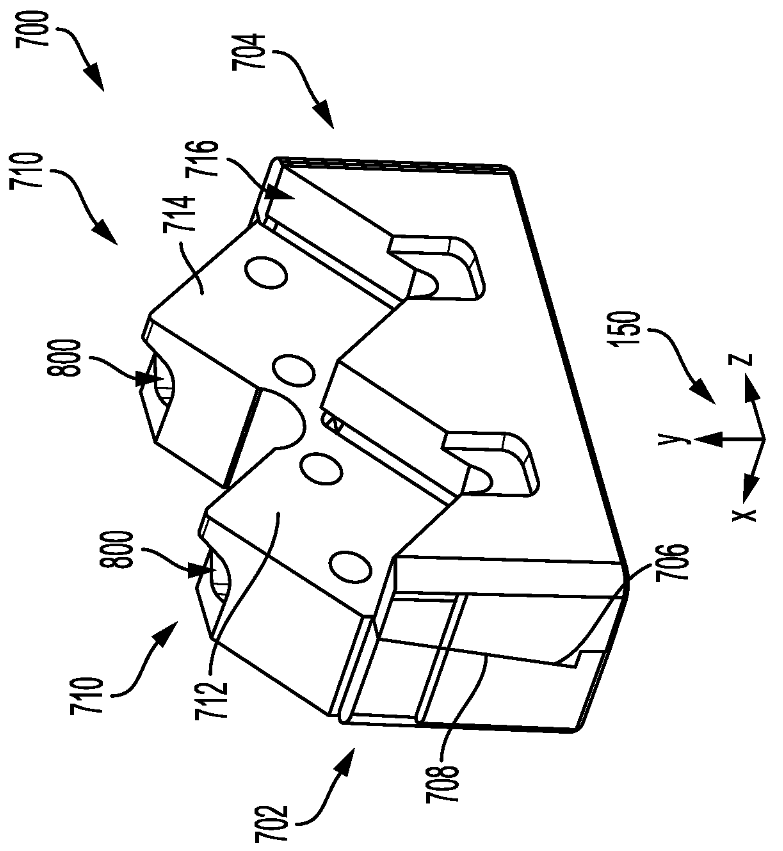
Figure 9:
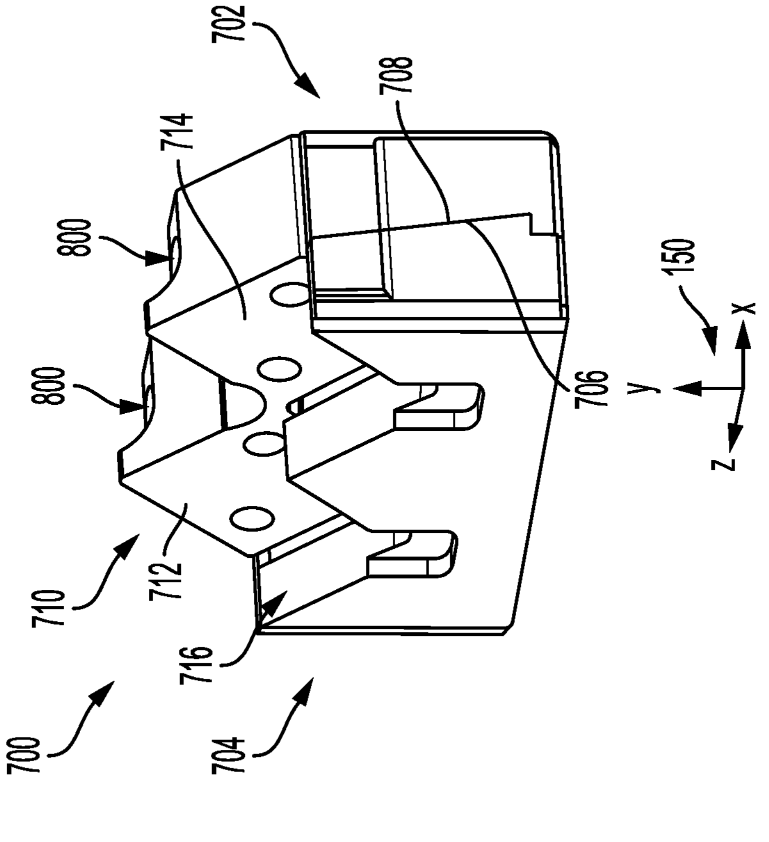

In the illustrated embodiment, a cutting protrusion 710 in the holder 702 includes two diamond shaped sections 712, 714, as opposed to single diamond shaped section in the cutting protrusion 260 depicted in FIG. 2. A cutter, which has been omitted from the assembly 700, may include similarly shaped diamond sections which seat in detents 716 in the wedge 704. FIGS. 8-10 illustrate openings 800 that extend downward through the holder and, when assembled, may accept bolts that thread into the pocket and have heads that seat in a counterbore of the openings.

Figure 11:
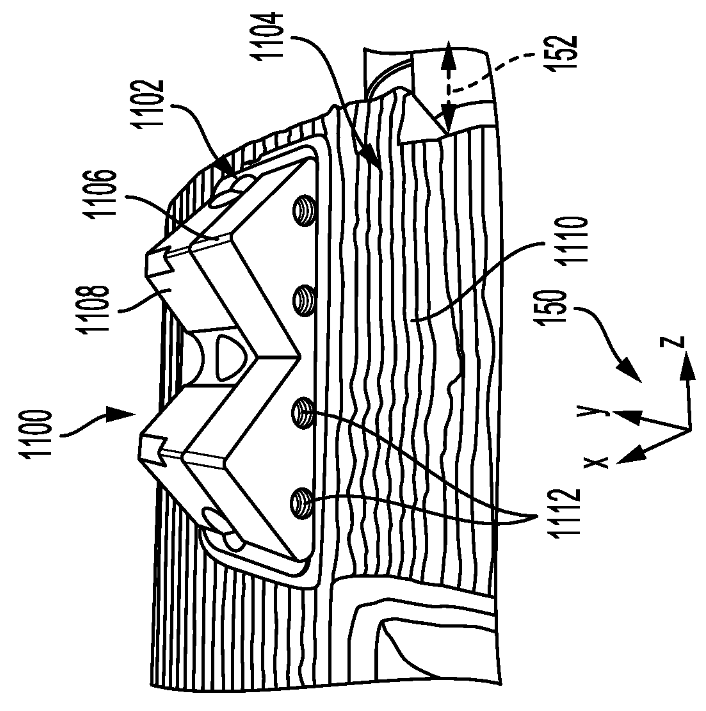
FIG. 11 shows another example of a cutter assembly installed in a shaft.

FIG. 11 depicts a cutter assembly 1100 installed in a pocket 1102 of a rotational shaft 1104. As shown, a cutter 1106 and a holder cutting protrusion 1108 extend above a peripheral surface 1110 of the rotational shaft 1104. Further, the cutter 1106 and the holder cutting protrusion 1108 are aligned with regard to their height. However, cutters with offset arrangements have been envisioned. The profile and relative position of the cutters may be selected based on the type of material slated for processing by the machine, the expected loading of the cutters, the operational speed range of the rotational shaft, and the like. Threaded openings 1112 in the cutter 1106 that laterally extend therethrough are further depicted in FIG. 11.

Figure 12:
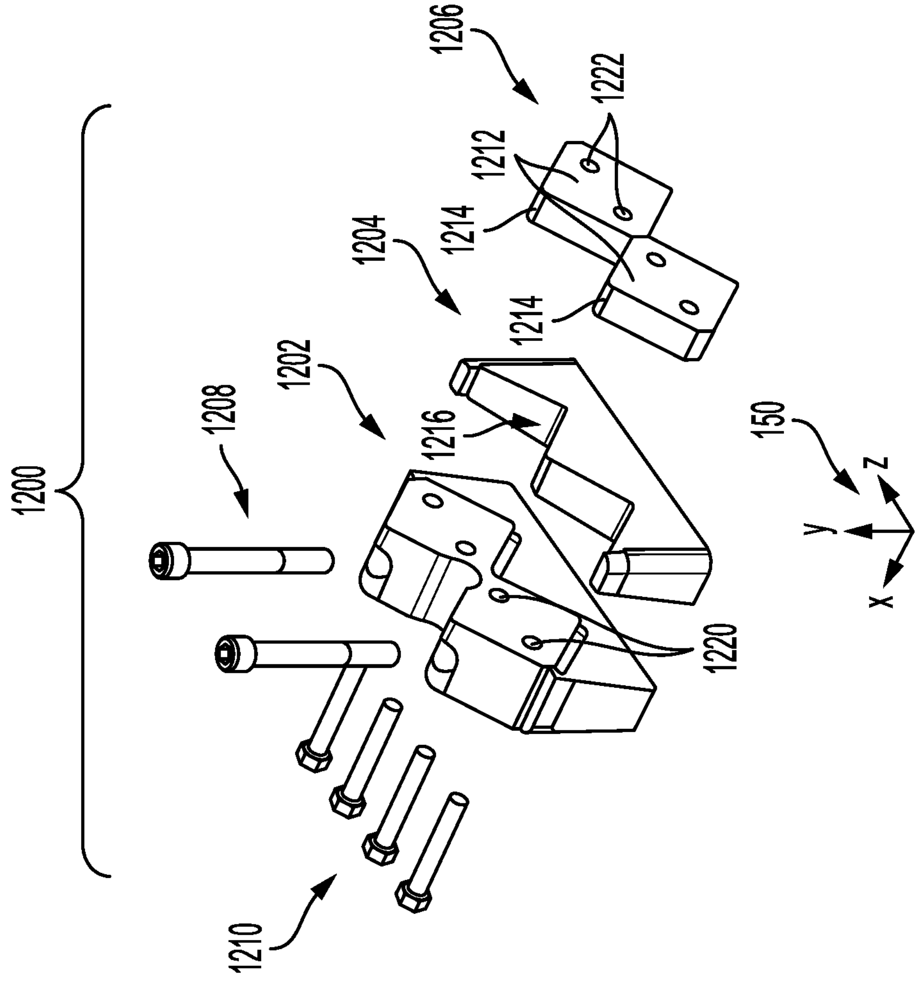
FIGS. 12-13 show a third embodiment of a cutter assembly.
Figure 13:
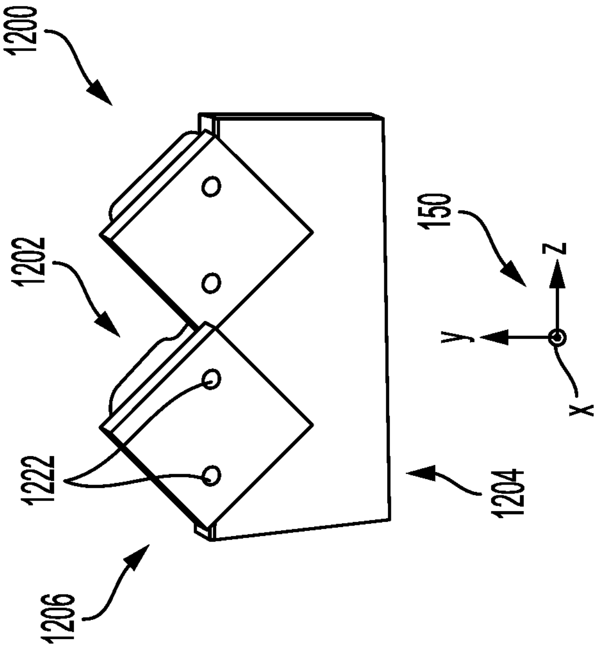

FIGS. 12-13 illustrate a third embodiment of a cutter assembly 1200. The cutter assembly 1200 again includes a holder 1202, wedge 1204, cutter 1206, and attachment devices 1208, 1210. However, steps in the wedge 1204 and holder 1202 are omitted from the cutter assembly 1200, which may decrease manufacturing costs at the expense of retaining the holder in the pocket in the case of bolt degradation. The cutter 1206 specifically may include two square shaped portions 1212 with edges 1214 at the top of the cutter. When assembled, the cutter 1206 rests in indents 1216 of the wedge 1204 and the attachment devices 1210 extend laterally through openings 1220 in the holder and thread into openings 1222 in the cutter. In this way, the cutter may be secured in a desired location. Further, it will be understood that the attachment devices 1208 and 1210 may be referred to as sets of attachment devices which may include one or more devices. The other attachment devices described herein may also be conceptually delineated into sets.

Figure 14D:
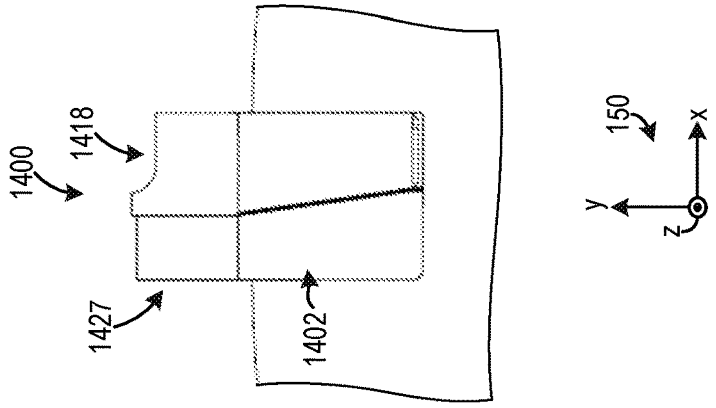
FIGS. 14A-14D show an installation sequence for a cutter assembly in a pocket of a rotational shaft.
Figure 14C:
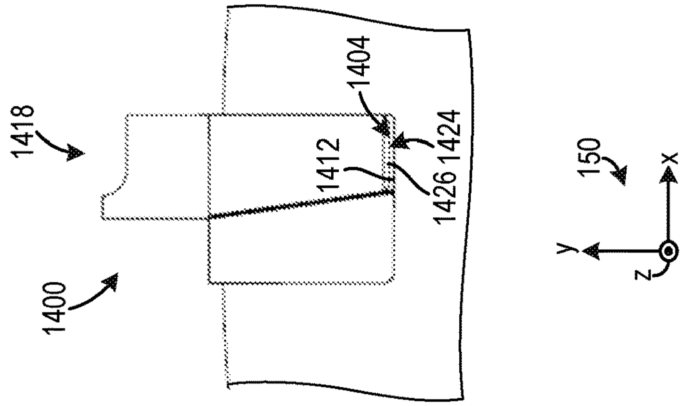
Figure 14B:
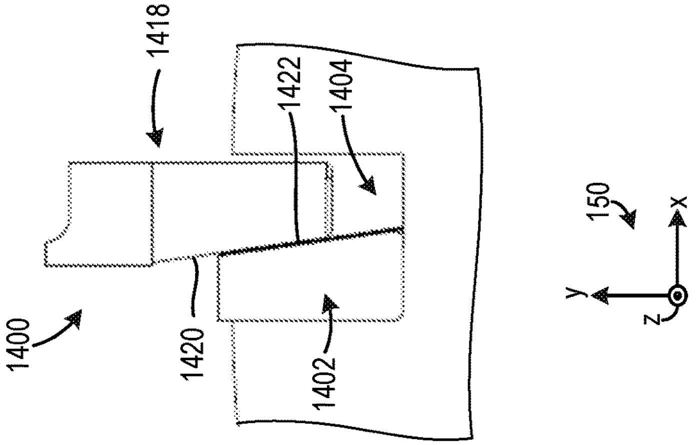
Figure 14A:
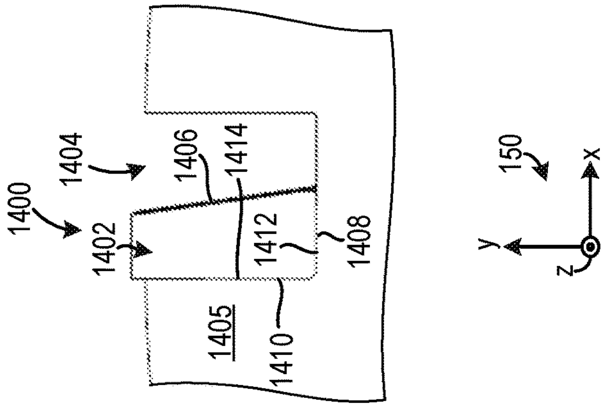

FIGS. 14A-14D show an installation sequence for a cutter assembly 1400. The cutter assembly 1400 may have similar features to the cutter assembly 1200, shown in FIGS. 12-13, but, when assembled, includes a shim for fine tuning the lateral spacing of the components. Initially, as shown in FIG. 14A, a wedge 1402 is placed in a pocket 1404 of a rotational shaft 1405 with a shim 1406. When in place, a bottom surface 1408 and a planar side surface 1410 of the wedge 1402 are in face sharing contact with a bottom wall 1412 and a side wall 1414, respectively, of the pocket 1404.

Next in FIG. 14B, insertion of a holder 1418 into the pocket 1404 begins, and the angled surfaces 1420, 1422 of the holder 1418 and the wedge 1402, respectively, start to interact. In FIG. 14C, the holder 1418 is inserted further into the pocket 1404. However, a gap 1424 between the bottom wall 1412 of the pocket 1404 and a bottom side 1426 of holder 1418 persists. To further wedge the assembly into the pocket attachment devices are inserted through the holder and threaded into openings in the pocket 1404. Once a desired wedge effect is achieved, a cutter 1427 is installed in the wedge 1402, as shown in FIG. 14D, and attachment devices are inserted laterally through openings in the holder 1418 and threaded into the cutter 1427 to secure the cutter.

Figure 15:
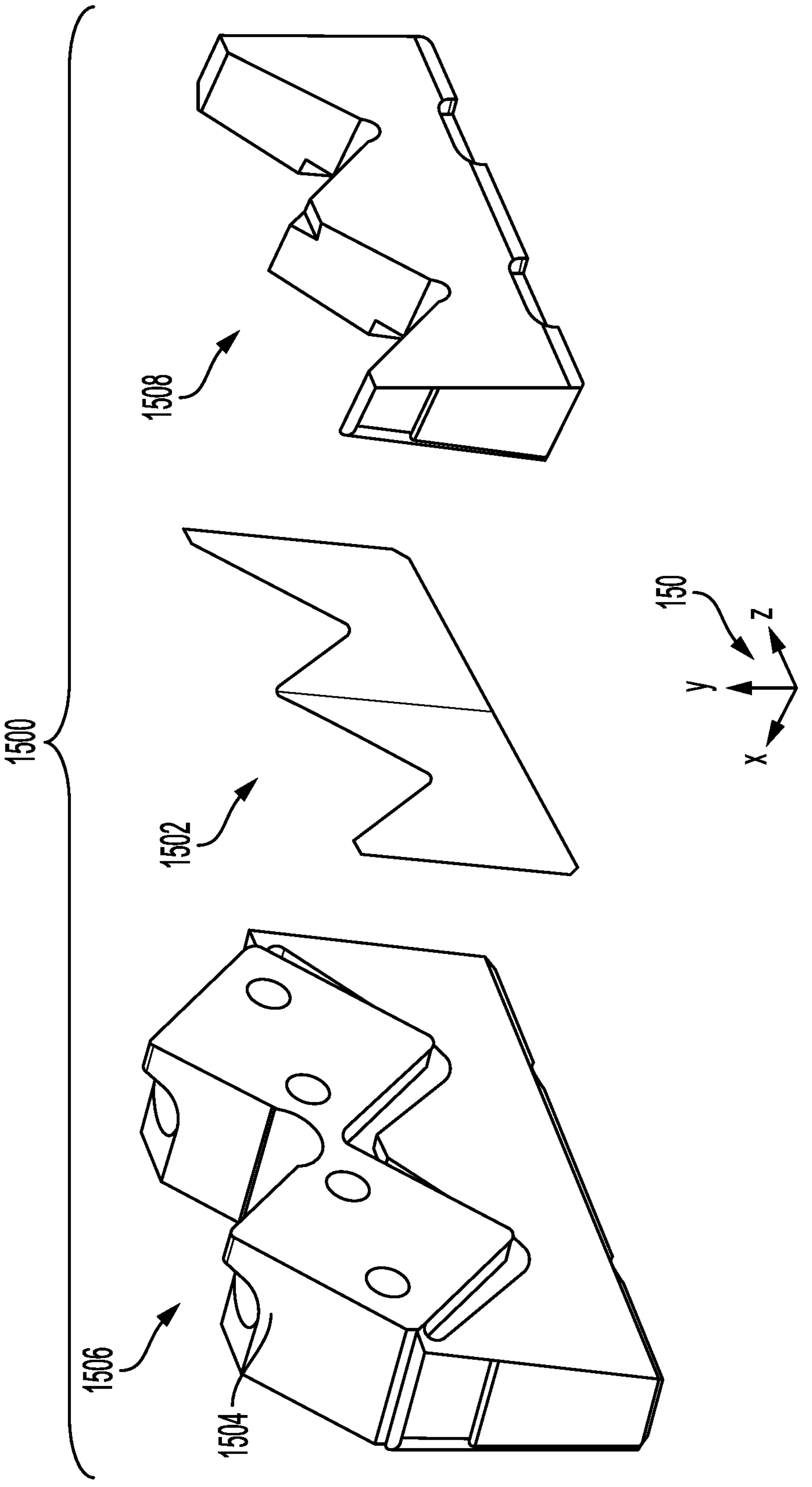
FIG. 15 shows a fourth embodiment of a cutter assembly.

FIG. 15 shows another embodiment of a cutter assembly 1500 with a shim 1502 that may be used to fine tune cutter assembly installation and take up gaps that may arise from component manufacturing tolerances. The shim 1502 may be contoured to be placed below a cutting protrusion 1504 of a holder 1506, and when installed, the shim interposes the holder 1506 and a wedge 1508.

Figure 16D:
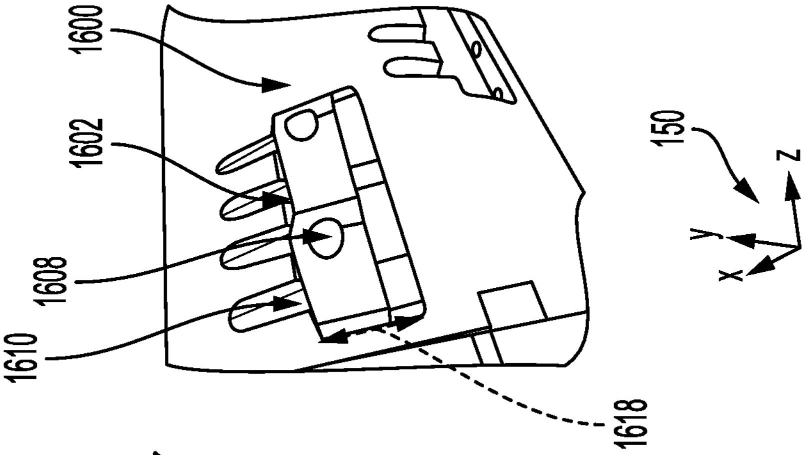
FIGS. 16A-16D show another example of an installation sequence for a cutter assembly in a pocket of a rotational shaft.
Figure 16C:
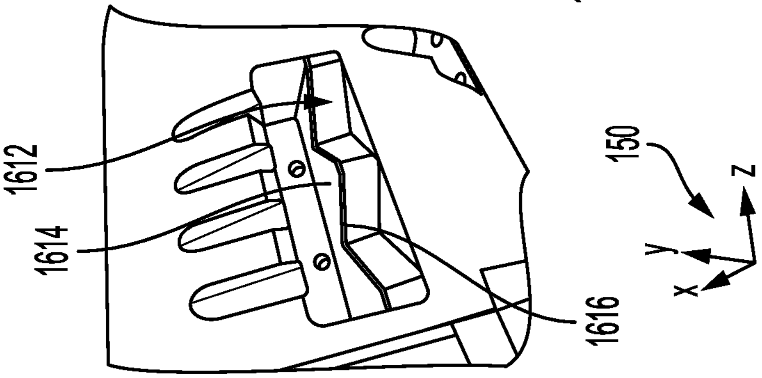
Figure 16B:
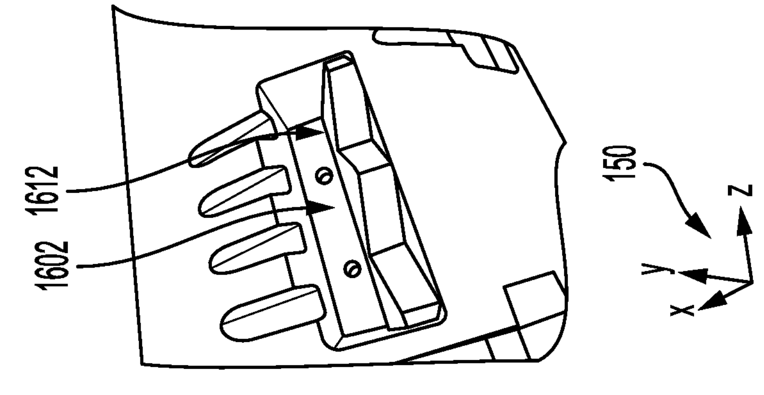
Figure 16A:
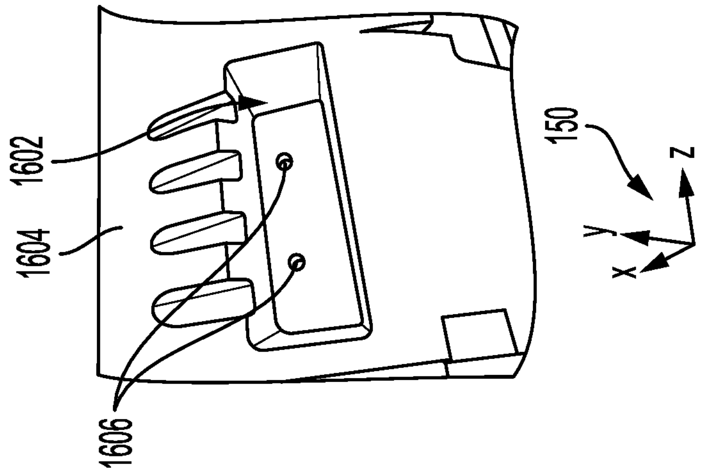

FIGS. 16A-16D show an installation sequence for a cutter assembly 1600. In particular, FIG. 16A depicts a pocket 1602 in a rotational shaft 1604. The pocket 1602 includes threaded openings 1606 sized to receive attachment devices that are inserted through openings 1608 in a holder 1610, shown in FIG. 16D. Next in FIG. 16B, a wedge 1612 is placed in the pocket 1602 and, in FIG. 16C, a shim 1614 is positioned on an angled surface 1616 of the wedge 1612. Next in FIG. 16D, the holder 1610 is placed in the pocket 1602 and begins to increase the width of the assembly to securely hold it in the pocket. Next, attachment devices may be inserted through the openings 1608 in the holder and torqued to further expand the width 1618 of the assembly and secure it place. In this way, the chance of movement of the different components in the assembly is reduced.

Figure 17:
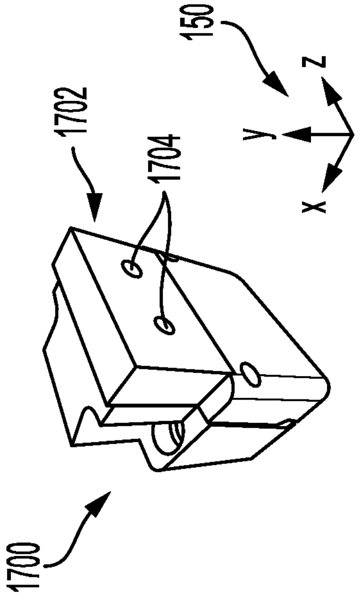
FIG. 17 shows a fifth embodiment of a cutter assembly.

FIG. 17 shows another embodiment of a cutter assembly 1700. The cutter assembly 1700 may have a wedge design similar to the previously described cutter assemblies but may include a differently shaped cutter 1702. The cutter 1702 is specifically rectangular in shape and includes a planar surface at a top side, in the illustrated embodiment. However, numerous suitable cutter profiles have been envisioned. The cutter 1702 again includes threaded openings 1704 that are contoured to receive attachment devices.

Figure 18:
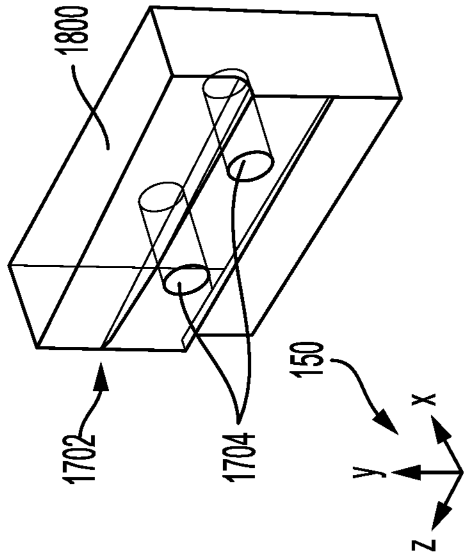
FIG. 18 shows a detailed perspective view of a cutter in the cutter assembly, depicted in FIG. 17.

FIG. 18 shows a detailed view of the cutter 1702, illustrated in FIG. 17. The top side 1800 of the cutter is again shown, along with the threaded openings 1704.

FIGS. 1-18 are drawn approximately to scale. However, other relative dimensions may be used, in other embodiments.

FIGS. 1-18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being polygonal, circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Still further elements offset from one another may be referred to as such. It will be appreciated that one or more components referred to as being "similar" differ from one another according to manufacturing tolerances (e.g., within 1-5% deviation). Furthermore, as describe herein "approximately" refers to a deviation by 5% or less, unless otherwise noted.

It will be appreciated that the configurations disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The invention will further be described in the following paragraphs. In one aspect, a cutter assembly for an industrial machine is provided that includes a wedge tapering in an outward direction and including a first angled surface, the first angled surface extending from a base side that is configured to seat in a pocket in a rotational shaft; and a holder including: a tapered section tapering in an inward direction toward a base side of the holder and including a second angled surface that is configured to form an interface with the first angled surface; and one or more attachment device openings each configured to receive an attachment device.

In another aspect, an industrial machine is provided that includes a rotational shaft including a pocket; and a cutter assembly designed to removably attach to the pocket, the cutter assembly comprising: a wedge tapering in an outward radial direction and including a first angled surface that extends from a base that is configured to seat in the pocket; and a holder including: a tapered section tapering in an inward direction and including a second angled surface that is in face sharing contact with the first angled surface.

In another aspect, a cutter assembly for an industrial shredding machine is provided that includes a wedge tapering in an outward direction and including a first angled surface, the first angled surface extending from a base that seats in a pocket of a rotational shaft; a holder including: a tapered section tapering in an inward direction and including a second angled surface that is in face sharing contact with the first angled surface; a first set of attachment openings each configured to receive an attachment device that is designed to removably couple to the pocket in the rotational shaft; and a first planar side surface configured to be in face sharing arrangement with a planar surface of the pocket; and a cutter mated in a detent in the wedge and including a planar surface that is in face sharing contact with a second planar surface of the holder.

In any of the aspects or combinations of the aspects, the wedge may include a first step, the holder may include a second step, the first and second steps may mate, and the first step may constrain outward movement of the second step.

In any of the aspects or combinations of the aspects, the holder may include one or more attachment device openings that extend laterally through the holder and are each designed to receive an attachment device and permit movement of the holder during installation.

In any of the aspects or combinations of the aspects, the holder may include a polygonal cutter with two opposing planar sides and one of the two opposing planar sides may be configured to be in face sharing contact with a side wall in the pocket.

In any of the aspects or combinations of the aspects, the cutter assembly may further include a cutter configured to mate with a detent in the wedge.

In any of the aspects or combinations of the aspects, the one or more attachment device openings may extend in a radial direction.

In any of the aspects or combinations of the aspects, the wedge may be constructed out of a different type of steel than the holder.

In any of the aspects or combinations of the aspects, the holder may include a first attachment device opening configured to receive a first attachment device that is designed to removably couple to the pocket.

In any of the aspects or combinations of the aspects, the first attachment device opening may be radially aligned.

In any of the aspects or combinations of the aspects, the holder may include a laterally aligned attachment device opening that is designed to receive a second attachment device and permit movement of the holder during installation.

In any of the aspects or combinations of the aspects, the industrial machine may further include a cutter configured to mate with a detent in the wedge and including a second attachment device opening that is aligned with the first attachment device opening of the holder.

In any of the aspects or combinations of the aspects, the industrial machine may further include a cutter including a planar face configured to contact a first planar face in a cutting protrusion of the holder.

In any of the aspects or combinations of the aspects, the cutting protrusion may include a second planar face that is arranged on an opposing side of the holder and parallel to the first planar face.

In any of the aspects or combinations of the aspects, the wedge may include a first step with an overhang that restricts outward movement of the holder.

In any of the aspects or combinations of the aspects, the holder may further include a second set of attachment openings aligned with a set of threaded openings that extend through the cutter.

In any of the aspects or combinations of the aspects, the cutter assembly may further include a plurality of attachment devices axially extending through the second set of attachment openings and threadingly engaged with the set of threaded openings.

In any of the aspects or combinations of the aspects, the holder may include a polygonal section with two opposing planar sides and one of the two opposing planar sides may be configured to be in face sharing contact with a side surface in the pocket of the rotational shaft.

In any of the aspects or combinations of the aspects, the wedge may include a first step at a base side and the first step may include an overhang that restricts outward movement of the holder.

In any of the aspect or combinations of the aspect, the first angled surface may be arranged at an angle between 6 and 12 degrees.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Those skilled in the art will recognize that it is common within the art to describe devices and/or processes in the fashion set forth herein, and thereafter use standard engineering practices to integrate such described devices and/or processes into larger systems.

Embodiments of systems for industrial machines have been described. The following claims are directed to said embodiments, but do not preempt creating industrial machines in the abstract. Those having skill in the art will recognize numerous other approaches to creating industrial machines, precluding any possibility of preemption in the abstract. The terms used in the appended claims are defined herein with the proviso that the claim terms may be used in a different manner if so defined by express recitation.

The invention claimed is:

1. An industrial machine comprising:
- a rotational shaft including a pocket; and
- a cutter assembly designed to removably attach to the pocket, the cutter assembly comprising:
  - a wedge tapering in an outward radial direction and including a first angled surface that extends from a base that is configured to seat in the pocket; and
  - a holder including:
    - a tapered section tapering in an inward direction and including a second angled surface that is in face sharing contact with the first angled surface;
    - a first attachment device opening configured to receive a first attachment device that is designed to removably couple to the pocket; and
    - a laterally aligned attachment device opening that is designed to receive a second attachment device and permit movement of the holder during installation.

2. The industrial machine of claim 1, wherein the first attachment device opening is radially aligned.

3. The industrial machine of claim 1, further comprising a cutter configured to mate with a detent in the wedge and including a second attachment device opening that is aligned with the first attachment device opening of the holder.

4. The industrial machine of claim 1, wherein the wedge includes a first step with an overhang that restricts outward movement of the holder.

5. An industrial machine comprising:
- a rotational shaft including a pocket; and
- a cutter assembly designed to removably attach to the pocket, the cutter assembly comprising:
  - a wedge tapering in an outward radial direction and including a first angled surface that extends from a base that is configured to seat in the pocket; and
  - a holder including:
    - a tapered section tapering in an inward direction and including a second angled surface that is in face sharing contact with the first angled surface; and
    - a cutter including a planar face that is configured to contact a first planar face in a cutting protrusion of the holder.

6. The industrial machine of claim 5, wherein the cutting protrusion includes a second planar face that is arranged on an opposing side of the holder and parallel to the first planar face.

7. A cutter assembly for an industrial shredding machine, comprising:
- a wedge tapering in an outward direction and including a first angled surface, the first angled surface extending from a base that seats in a pocket of a rotational shaft;
- a holder including:
  - a tapered section tapering in an inward direction and including a second angled surface that is in face sharing contact with the first angled surface;
  - a first set of attachment openings each configured to receive an attachment device that is designed to removably couple to the pocket in the rotational shaft; and
  - a first planar side surface configured to be in face sharing contact with a planar surface of the pocket; and
- a cutter mated in a detent in the wedge and including a planar surface that is in face sharing contact with a second planar surface of the holder.

8. The cutter assembly of claim 7, wherein the holder further comprises a second set of attachment openings aligned with a set of threaded openings that extend through the cutter.

9. The cutter assembly of claim 8, further comprising a plurality of attachment devices axially extending through the second set of attachment openings and threadingly engaged with the set of threaded openings.

10. The cutter assembly of claim 7, wherein the holder includes a polygonal section with two opposing planar sides and one of the two opposing planar sides is configured to be in face sharing contact with a side surface in the pocket of the rotational shaft.

11. The cutter assembly of claim 7, wherein the wedge includes a first step at a base side and the first step includes an overhang that restricts outward movement of the holder.

* * * * *